No. 662,174. Patented Nov. 20, 1900.
J. C. STANLEY.
CHECK ROW CORN PLANTER.
(Application filed Aug. 29, 1900.)
(No Model.) 2 Sheets—Sheet 1.
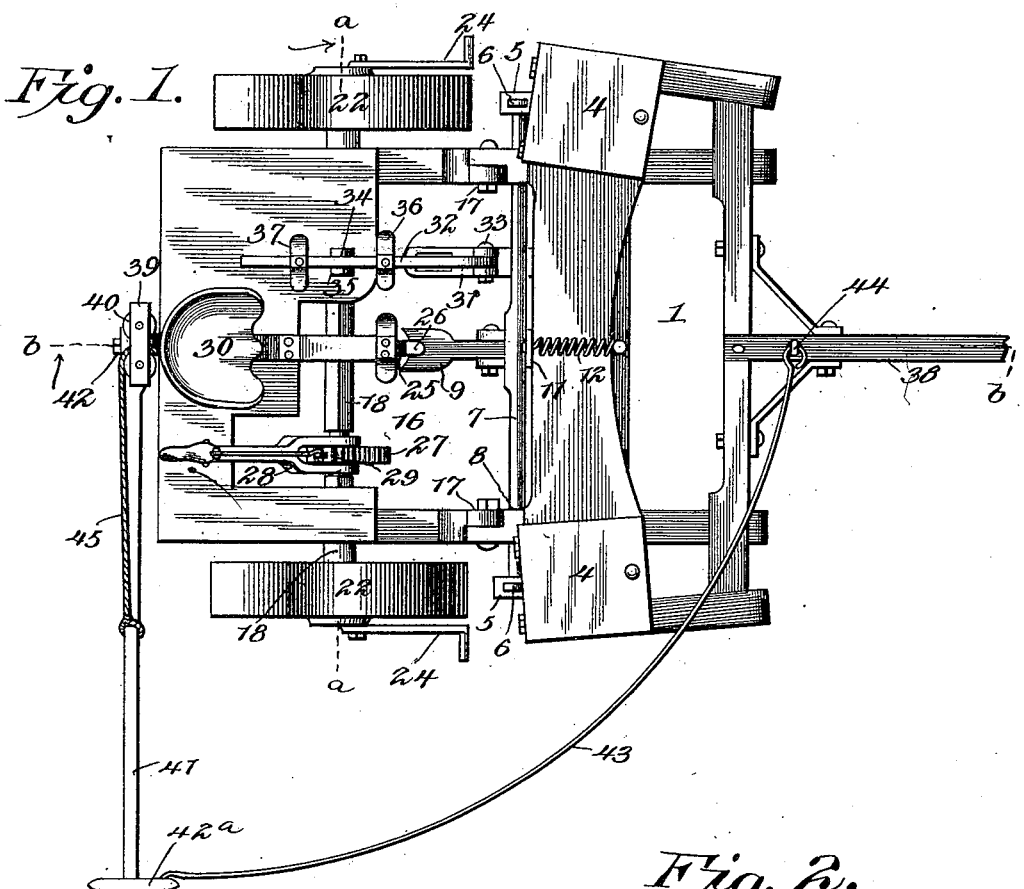
Witnesses
Howard D. Orr
J. W. Garner
James C. Stanley, Inventor.
by C. A. Snow & Co.
Attorneys No. 662,174. Patented Nov. 20, 1900.
J. C. STANLEY.
CHECK ROW CORN PLANTER.
(Application filed Aug. 29, 1900.)

(No Model.) 2 Sheets—Sheet 2.

Witnesses
Howard D. Ort
J. W. Garner

James C. Stanley, Inventor,
by C. A. Snow & Co.
Attorneys

UNITED STATES PATENT OFFICE.

JAMES C. STANLEY, OF BIRMINGHAM, IOWA.

CHECK-ROW CORN-PLANTER.

SPECIFICATION forming part of Letters Patent No. 662,174, dated November 20, 1900.

Application filed August 29, 1900. Serial No. 28,451. (No model.)

*To all whom it may concern:*

Be it known that I, JAMES C. STANLEY, a citizen of the United States, residing at Birmingham, in the county of Van Buren and State of Iowa, have invented a new and useful Check-Row Corn-Planter, of which the following is a specification.

My invention is an improved check-row corn-planter; and it consists in the peculiar construction and combination of devices hereinafter fully set forth, and pointed out in the claims.

Figure 3:
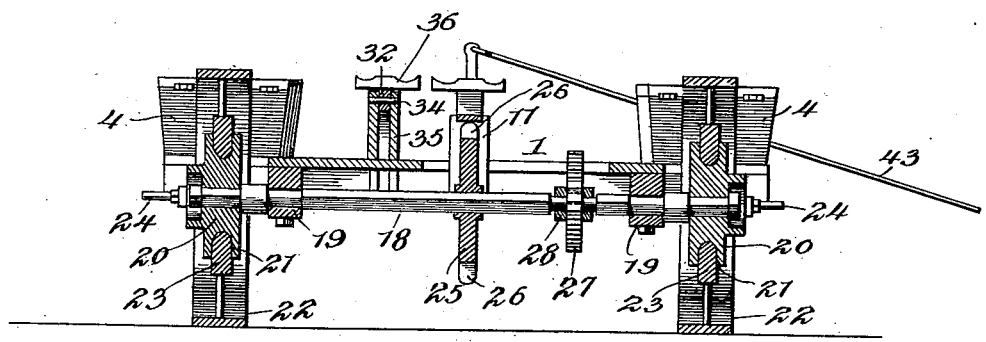
Figure 4:
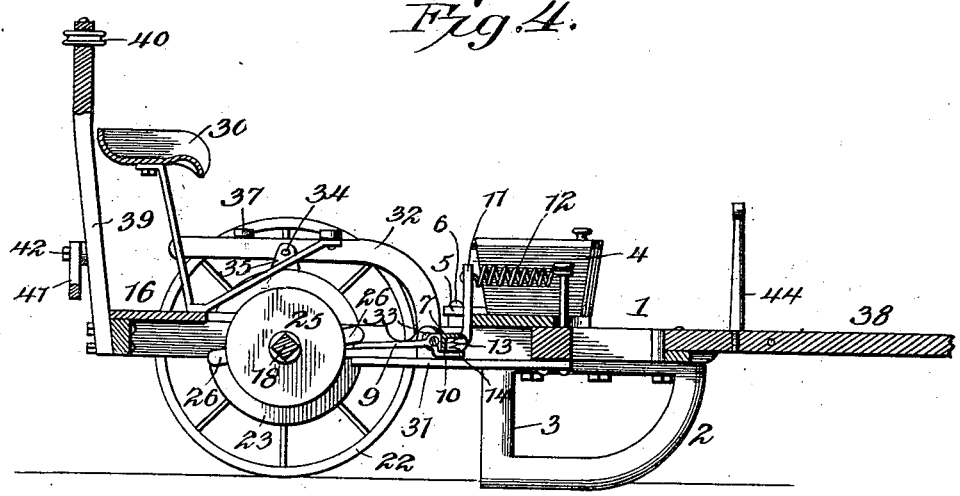

In the accompanying drawings, Figure 1 is a top plan view of a check-row corn-planter embodying my improvements. Fig. 2 is a side elevation of the same. Fig. 3 is a vertical transverse sectional view taken on the line *a a* of Fig. 1. Fig. 4 is a vertical longitudinal sectional view of the same, taken on the line *b b* of Fig. 1.

The front frame 1 is provided with the usual shoes 2 for opening the furrows, the usual seed-spouts 3, and hoppers 4 for the seeds. In the hoppers operate the seed-slides, which are indicated at 5, the said seed-slides having rearward extensions which project beyond the rear sides of the hoppers and are engaged by rock-arms 6 at the ends of a rock-shaft 7, which operates the seed-slides. The said rock-shaft is journaled in suitable bearings, as at 8, with which the front frame is provided. An arm or lever 9 is pivotally mounted on the rock-shaft 7, projects rearward therefrom, and is free to move upward independently of said rock-shaft. The latter and said lever 9 are provided with coacting shoulders 10, by means of which downward movement of the lever 9 causes the rock-shaft to partly turn in one direction, and thereby draw the seed-slides outward and cause seeds to be dropped from the seed boxes or hoppers through the seed-tubes into the furrows made by the shoes 2. A rock-arm 11 projects from the upper side of the rock-shaft 7, and a spring 12 is connected to said rock-arm and serves to return the rock-shaft and the seed-slides to their initial positions. A spring 13 bears on a forward-extending shoulder 14, with which the lever 9 is provided.

The wheel-frame 16 is pivotally connected to the rear side of the front frame, as at 17. A shaft 18, which forms an axle, is journaled in bearings 19, with which the wheel-frame is provided. The ends of the said shaft are angular in cross-section, and on the same are secured friction-hubs 20, which rotate with said axle-shaft and are provided with angular grooves 21 in their peripheries, which grooves are angular in cross-section or curved to form bearing-surfaces. The traction and supporting wheels 22 have concentrically-disposed friction-rings 23, which operate in the friction-grooves 21. Normally the friction between the coacting surfaces of the friction-hubs and friction-rings is sufficient to cause the axle-shaft to rotate with the traction-wheels; but the said shaft may be rotated by the means hereinafter described independently of the traction-wheels for the purpose of adjusting the machine to cause the corn to be planted in check-rows. To each of the friction-hubs is attached a marker 24. An operating-wheel 25 is secured to the axle-shaft and rotates therewith, and said wheel is provided with a suitable number of spurs or tappets 26, which by engagement with the lever 9 as the axle-shaft rotates operate the seed-dropping mechanism, as will be understood. The markers 24 are so adjusted with reference to the wheel 25 that the said markers will be on the lower sides of the traction-wheels and in line with the hills in which the seeds have been dropped, so that the markers will mark the soil at points indicating the positions of the hills.

A spur-wheel 27, which I will hereinafter refer to as the "adjusting-wheel," is keyed or otherwise secured on the axle-shaft, and an adjusting-lever 28 is fulcrumed on the axle-shaft, is adapted to be operated by hand, and carries a spring-pressed dog 29, which may be engaged with the adjusting-wheel to lock the adjusting-lever thereto, and by operating the lever the shaft which carries the markers may be rotated to the extent that may be required to adjust the machine so that the markers will correctly designate the localities of the planted hills and to actuate the seed-dropping mechanism by hand, as may be required, in adjusting the machine to cause the hills to be planted strictly in check-rows.

The seat 30 for the driver is mounted suitably on the wheel-frame near the adjusting-lever 28.

An arm 31 projects rearward from the front frame and is flexibly connected to the front end of a foot-lever 32, as at 33. The said foot-lever is fulcrumed at 34 on a support 35, with which the wheel-frame is provided, and the said foot-lever is provided at points in front and rear of the fulcrum 34 with pedals 36 37, respectively.

By depressing the rear end of the lever 32 by one foot the driver may raise the front end of said lever and cause the same to raise the front frame, so as to clear the shoes of the ground, the fulcrum for the front frame when the same is thus raised being at the front end of the tongue 38. By depressing on the pedal 36 the front end of the lever 32 is lowered, thereby causing the front frame to be lowered to operative position. It will be understood that by means of the flexible connection hereinbefore described between the operating-lever 9 and rock-shaft 7 the axle may be rotated in the wheels by the hand-lever and adjusting devices, as may be required, to adjust the machine without operating the seed-dropping mechanism.

A standard 39 is secured centrally on the rear side of the wheel-frame, and at the upper end of the said standard are a pair of sheaves 40. A bar 41, which is adapted to be swung to either side of the machine, is pivoted at its inner end to the standard 39, as at 42, and carries at its outer end a furrow marker or runner 42ª. A cord or wire 43 is attached at its rear end to the front end of the said furrow-marking runner or to the bar 41, and the front end of the said cord or wire is attached to a suitable standard 44, which rises from the tongue near the rear end of the latter. It will be understood that by this means the machine is enabled to be driven in strictly parallel lines when in operation to secure parallelism of the planted rows. A cord 45 is attached to the bar 41 and passes between the sheaves 40 and may be employed by the driver in raising the bar 41 to swing the marking-runner 42 to either side of the machine, as may be required.

Having thus described my invention, I claim—

1. In a check-row corn-planter, the combination of the axle-shaft having the friction-hubs, and provided with markers, the traction-wheels having the friction-rings engaging said friction-hubs, whereby said axle-shaft may be turned with or independently of said traction-wheels, and adjusting mechanism to operate said axle-shaft independently of said traction-wheels, for the purpose set forth, substantially as described.

2. In a check-row corn-planter, the combination of a seed-dropping mechanism having the rock-shaft provided with the arm 11 and shoulder 13, the spring attached to said arm, the operating-lever connected to said rock-shaft and free to turn independently thereof in one direction, said rock-shaft and said operating-lever having coacting shoulders and said operating-lever having the arm 14 extended under the said rock-shaft, the spring bearing on said arm 14, the axle-shaft having the friction-hubs and provided with markers, the traction-wheels having the friction-rings engaging said friction-hubs, whereby said axle-shaft may be turned with or independently of said friction-wheels, adjusting mechanism to operate said axle-shaft independently of said traction-wheels, and the operating-wheel on said axle-shaft and having tappets to engage the operating-lever, substantially as described.

In testimony that I claim the foregoing as my own I have hereto affixed my signature in the presence of two witnesses.

JAMES C. $\overset{\text{his}}{\times}$ STANLEY.
<span style="margin-left:3em">mark</span>

Witnesses:
CHAS. D. LEGGETT,
STANLEY M. DU BOIS.